(12) United States Patent
Ohnishi

(10) Patent No.: US 9,428,659 B2
(45) Date of Patent: Aug. 30, 2016

(54) TRANSFER PRINTING INK AND TRANSFER PRINTING METHOD

(71) Applicant: MIMAKI ENGINEERING CO., LTD., Nagano (JP)

(72) Inventor: Masaru Ohnishi, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 329 days.

(21) Appl. No.: 14/072,810

(22) Filed: Nov. 6, 2013

(65) Prior Publication Data

US 2014/0125746 A1  May 8, 2014

(30) Foreign Application Priority Data

Nov. 7, 2012  (JP) ................................. 2012-245764

(51) Int. Cl.
| | |
|---|---|
| *B41J 2/21* | (2006.01) |
| *C09D 11/30* | (2014.01) |
| *B41M 5/025* | (2006.01) |
| *B41M 5/035* | (2006.01) |
| *C09D 11/328* | (2014.01) |
| *C09B 67/20* | (2006.01) |
| *C09B 67/02* | (2006.01) |

(52) U.S. Cl.
CPC .............. *C09D 11/30* (2013.01); *B41J 2/2107* (2013.01); *B41M 5/0256* (2013.01); *B41M 5/035* (2013.01); *B41M 5/0356* (2013.01); *C09B 67/0063* (2013.01); *C09B 67/0097* (2013.01); *C09D 11/328* (2013.01)

(58) Field of Classification Search
CPC ..... C09D 11/30; C09D 11/32; C09D 11/328; C09D 11/38; B41M 5/0256; B41M 5/035; B41J 2/0057; B41J 2/325

USPC ......................................... 347/100, 103, 213
See application file for complete search history.

(56) References Cited

U.S. PATENT DOCUMENTS

| | | | |
|---|---|---|---|
| 6,270,933 B1* | 8/2001 | Thompson | B41M 5/0356 430/109.3 |
| 8,709,696 B2* | 4/2014 | Wang | B41M 5/0356 106/31.13 |
| 2002/0109764 A1* | 8/2002 | Hale | B41F 16/02 347/100 |
| 2010/0073408 A1* | 3/2010 | Hale | B41J 2/315 347/5 |
| 2011/0007118 A1* | 1/2011 | Xu | B41J 2/17593 347/88 |

(Continued)

FOREIGN PATENT DOCUMENTS

| | | |
|---|---|---|
| CN | 1646642 | 7/2005 |
| CN | 102642414 | 8/2012 |
| JP | 2002-079751 | 3/2002 |

OTHER PUBLICATIONS

MSDS polyvinylpyrrolidone, May 21, 2013, Sciencelab.com, p. 3.*

(Continued)

*Primary Examiner* — Manish S Shah
(74) *Attorney, Agent, or Firm* — Jianq Chyun IP Office

(57) ABSTRACT

Provided are a transfer printing ink and a transfer printing method which are advantageous in that an increased number of types of transfer media can be employed. The transfer printing ink of the present invention contains a solvent, a sublimation dye, and a binder resin, wherein the binder resin is dispersed, emulsified, or suspended in the solvent, and the binder resin has a melting point which is higher than the lowest temperature at which the sublimation dye sublimates.

1 Claim, 1 Drawing Sheet

(56) References Cited

U.S. PATENT DOCUMENTS

2011/0169901 A1* 7/2011 Pinto ............... D06P 1/5235
 347/101
2012/0040287 A1* 2/2012 Wang ............... G03G 15/2007
 430/125.32

OTHER PUBLICATIONS

First Office Action of China Counterpart Application, issued on Sep. 28, 2014, with English translation thereof, pp. 1-14.

Second Office Action of China Counterpart Application, issued on Jun. 10, 2015, with English translation thereof, pp. 1-18.

* cited by examiner

TRANSFER PRINTING INK AND TRANSFER PRINTING METHOD

CROSS-REFERENCE TO RELATED APPLICATIONS

This application claims the priority benefit of Japan application serial no. 2012-245764, filed on Nov. 7, 2012. The entirety of the above-mentioned patent application is hereby incorporated by reference herein and made apart of this specification.

BACKGROUND OF THE INVENTION

1. Field of the Invention

The present invention relates to a transfer printing ink and a transfer printing method.

2. Description of the Background Art

JP-A-2002-79751 (published on Mar. 19, 2002) has a description of a sublimation dyeing method in which an ink containing a sublimation dye is applied by printing to an ink-jet reception film having an ink-jet reception layer formed on a film product having a resin layer on the surface and then heated to perform sublimation dyeing.

By the way, there are only a small number of types of recording media on which an image or the like can be printed using the ink containing a sublimation dye. Specifically, in transfer printing performed in a way such that an image or the like is first printed on a transfer medium and then transferred from the transfer medium to a recording medium, there are only a small number of types of transfer media which can be employed.

SUMMARY OF THE INVENTION

The transfer printing ink of the invention includes a solvent, a sublimation dye, and a binder resin, wherein the binder resin is dispersed, emulsified, or suspended in the solvent, and the binder resin has a melting point which is higher than the lowest temperature at which the sublimation dye sublimates.

The ink having a binder resin dispersed, emulsified, or suspended in a solvent is rapidly increased in viscosity due to evaporation of the solvent, as compared to an ink having a binder resin dissolved in a solvent, and therefore, by using the above ink, many types of materials can be printed without repelling the ink and while preventing the ink from running on the materials. Therefore, an increased number of types of media can be used as a transfer medium.

Further, in the transfer of the image formed on a transfer medium, by heating the image at a temperature lower than the melting point of the binder resin, the transfer of the image can be performed without melting the binder resin.

Specifically, there is a problem in that when the image formed using an ink containing solids, such as a resin, on a transfer medium is transferred to a recording medium by pressing the transfer medium against the recording medium, the solids are molten upon transferring the image, so that the transfer medium adheres to the recording medium with high strength, making it difficult to remove the transfer medium from the recording medium.

Further, there is a danger that the solids contained in the ink are transferred to the recording medium to cause the color developed by the sublimation dye to be muddy, adversely affecting the quality of the resultant image.

By the invention, it is possible to prevent a problem in that the binder resin is transferred to the recording medium to cause the color developed by the sublimation dye to be muddy. Further, it is possible to prevent a problem in that the binder resin is molten to cause the transfer medium to adhere to the recording medium.

The transfer printing method of the invention is a transfer printing method using a transfer printing ink comprising a solvent, a sublimation dye, and a binder resin, wherein the binder resin is dispersed, emulsified, or suspended in the solvent, wherein the transfer printing method includes the steps of: forming an image on a transfer medium using the transfer printing ink (image formation step); and heating the image in a state in which the side of the transfer medium on which the image is formed faces a recording medium to cause the sublimation dye to sublimate, transferring the dye to the recording medium (transfer step).

By using the ink having a binder resin dispersed, emulsified, or suspended in a solvent, many types of materials can be printed without repelling the ink and while preventing the ink from running on the materials.

In the transfer printing method of the invention, it is preferred that the binder resin in the transfer printing ink has a melting point which is higher than the lowest temperature at which the sublimation dye sublimates, and, in the transfer step, heating is performed at a temperature in a range of from the lowest temperature at which the sublimation dye sublimates to lower than the melting point of the binder resin.

In the transfer of the image formed on a transfer medium, by heating the image at a temperature lower than the melting point of the binder resin, the transfer of the image can be performed without melting the binder resin. Therefore, it is possible to prevent a problem in that the binder resin is transferred to the recording medium to cause the color developed by the sublimation dye to be muddy. Further, it is possible to prevent a problem in that the binder resin is molten to cause the transfer medium to adhere to the recording medium, making it difficult to remove the transfer medium from the recording medium.

In the transfer printing method of the invention, it is preferred that the image formation step is conducted by discharging the transfer printing ink onto the transfer medium by ink-jet.

The ink having a binder resin dispersed, emulsified, or suspended in a solvent can be advantageously used in ink-jet printing. Therefore, an image can be formed with ease by ink-jet printing.

DETAILED DESCRIPTION OF THE INVENTION

Figure 1A:
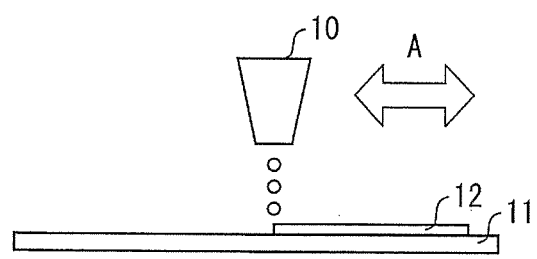
FIGS. 1A and 1B are views showing a flow of a transfer printing method according to an embodiment of the invention.

Hereinbelow, the present invention will be described in detail.

<Transfer Printing Ink>

The transfer printing ink of the invention includes a solvent, a sublimation dye, and a binder resin, wherein the binder resin is dispersed, emulsified, or suspended in the solvent, and the binder resin has a melting point which is higher than the lowest temperature at which the sublimation dye sublimates. In other words, the transfer printing ink of the invention is a latex ink containing a sublimation dye, wherein the binder resin contained in the latex ink has a melting point which is higher than the lowest temperature at which the sublimation dye sublimates.

By using a latex ink, many types of recording media can be printed without repelling the ink and while preventing the ink from running on the materials. Therefore, there can be achieved sublimation transfer printing which is advantageous in that an increased number of types of ink reception layers can be employed.

Further, in the transfer of the image formed on a transfer medium, by heating the image at a temperature in a range of from the temperature at which the sublimation dye sublimates to lower than the melting point of the binder resin, the transfer of the image can be performed without melting the binder resin. Therefore, it is possible to prevent a problem in that the binder resin is transferred to the recording medium to cause the color developed by the sublimation dye to be muddy. Further, it is possible to prevent a problem in that the binder resin is molten to cause the transfer medium to adhere to the recording medium, making it difficult to remove the transfer medium from the recording medium.

[Sublimation Dye]

With respect to the sublimation dye contained in the transfer printing ink of the invention, conventionally known various types of sublimation dyes can be employed.

The type of the sublimation dye used in the ink may be appropriately selected according to the use of the ink composition or the like, and examples of the sublimation dyes include azo disperse (sublimation) dyes, anthraquinone disperse dyes, and quinophthalone yellow disperse dyes.

The amount of the sublimation dye contained in the ink may be appropriately selected according to the use of the ink composition or the like, and is, for example, preferably 2 to 20% by weight, further preferably 3 to 10% by weight, based on the weight of the ink.

The sublimation dye may be in the form of microcapsules of gelatin, gum arabic, a urea resin, a urethane resin, or the like, or may be in the form of being included in the above resin.

[Latex Ink]

In the present specification, the term "latex ink" means an ink comprising a solvent and a binder resin wherein the binder resin is dispersed, emulsified, or suspended in the solvent.

As a specific example of the solvent, there can be mentioned water. In an aqueous latex ink having a binder resin dispersed, emulsified, or suspended in water, an aqueous emulsion or aqueous suspension of the binder resin is deemed to be formed.

As examples of the binder resins, there can be mentioned those having a melting point which is higher than the lowest temperature at which the sublimation dye sublimates, and specific examples include vinyl resins, acrylic resins, alkyd resins, polyester resins, polyurethane resins, silicon resins, fluororesins, epoxy resins, phenoxy resins, polyolefin resins, and modified resins thereof, each of which has the above-mentioned melting point. Of these, more preferred are acrylic resins, non-adherent silicon resins, polyethylene resins, polyurethane resins, polyester resins, and water-soluble acrylic resins, and especially preferred are non-adherent silicon resins, polyethylene resins, and acrylic resins.

Further, by using the binder resin having an increased degree of polymerization, it is possible to prevent a transfer medium from adhering to a recording medium. With respect to the degree of polymerization of the binder resin, for example, the molecular weight of the binder resin is preferably from 1,000 to 100,000. When the molecular weight of the binder resin is 1,000 or more, the viscosity of the resin can be reduced to suppress the adhesion of the resin to a medium. Further, when the molecular weight of the binder resin is 100,000 or less, an ink-jet ink obtained using such a binder resin has excellent discharging stability.

With respect to the binder resin contained in the latex ink, the above resins can be used individually or in combination. The amount of the binder resin incorporated into the ink can be arbitrarily determined according to the type of the binder resin used or the like, but, for example, the amount of the binder resin incorporated is preferably 1% by weight or more, more preferably 2% by weight or more, and preferably 20% by weight or less, more preferably 15% by weight or less, based on the weight of the ink.

The latex ink may further contain an emulsifying agent for emulsifying or suspending the binder resin.

The solvent in the latex ink may contain, in addition to the binder resin emulsified or suspended in the solvent, an additional resin dissolved in the solvent. The additional resin is dissolved in the solvent and can control the viscosity of the ink. The ink is dried to remove moisture, and thus the emulsified or suspended resin is bonded together to form a film, and, in this instance, the additional resin can function as a binding material to cause the emulsified or suspended binder resin to be further strongly bonded together.

With respect to the method for producing the transfer printing ink of the invention, there is no particular limitation, but, for example, the transfer printing ink may be produced by mixing into an arbitrary sublimation dye a conventionally known latex ink having, as a binder resin, a resin having a melting point which is higher than the lowest temperature at which the sublimation dye sublimates.

<Transfer Printing Method>

Figure 1B:
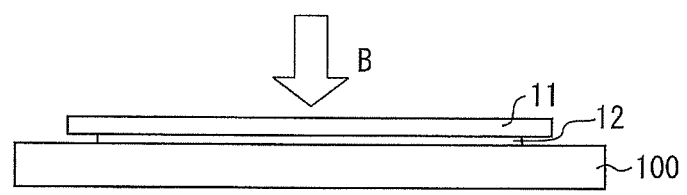

A transfer printing method according to an embodiment of the present invention is descried with reference to FIGS. 1A and 1B. FIGS. 1A and 1B are views showing a flow of the transfer printing method according to an embodiment of the invention.

[Ink for Forming an Image]

In the transfer printing method according to the present embodiment, the above-described transfer printing ink of the invention is used. That is, there is used an ink comprising a solvent, a sublimation dye, and a binder resin, wherein the binder resin is dispersed or emulsified in the solvent, and the binder resin has a melting point which is higher than the lowest temperature at which the sublimation dye sublimates. Even when the transfer printing ink of the invention is used in various types of recording media, the ink is unlikely to run on the media. Further, it is possible to prevent a problem in that the binder resin is transferred to the recording medium to cause the color developed by the sublimation dye to be muddy. Furthermore, it is possible to prevent a problem in that the binder resin is molten to cause the transfer medium to adhere to the recording medium, making it difficult to remove the transfer medium from the recording medium.

In the transfer printing method of the invention, a latex ink is used. Even when the latex ink is used in various types of recording media, the ink is unlikely to run on the media.

[Image Formation Step]

In the image formation step, as shown in FIG. 1A, an image is formed on a transfer paper (transfer medium) 11 using the transfer printing ink. Thus, as shown in FIG. 1A, an image layer 12 is formed on the transfer paper 11.

The formation of the image layer 12 is conducted by discharging the transfer printing ink onto the transfer paper 11 by ink-jet from a head 10 scanning the paper in the direction indicated by an arrow A. The transfer printing ink of the invention can be advantageously used in ink-jet.

[Transfer Step]

In the transfer step, as shown in FIG. 1B, the image layer 12 is heated in a state in which the side of the transfer paper 11 on which the image layer 12 is formed faces a medium (recording medium) 100 to cause the sublimation dye to sublimate, transferring the dye to the medium.

In the present embodiment, the image layer 12 is heated by applying thereto heat in the direction indicated by an arrow B in a state in which the image layer 12 is in contact with the medium 100, causing the sublimation dye forming the image layer 12 to sublimate, so that the dye is transferred onto the medium 100.

In this instance, the heating temperature is in a range of from the lowest temperature at which the sublimation dye sublimates to lower than the melting point of the binder resin contained in the transfer printing ink. By heating the image at that temperature, it is possible to prevent a problem in that the binder resin is transferred to the recording medium to cause the color developed by the sublimation dye to be muddy. Further, it is possible to prevent a problem in that the binder resin is molten to cause the transfer medium to adhere to the recording medium.

With respect to the specific method for heating, there is no particular limitation, and, for example, heating means, such as an infrared heater, a far infrared heater, or an oven, may be used.

Finally, the transfer paper 11 is removed from the medium 100, completing the transfer printing. That is, the transfer printing method of the invention may further include the step of removing the transfer medium from the recording medium.

[Additional Remarks]

As described above, the transfer printing ink according to an embodiment of the present invention includes a solvent, a sublimation dye, and a binder resin, wherein the binder resin is dispersed, emulsified, or suspended in the solvent, and the binder resin has a melting point which is higher than the lowest temperature at which the sublimation dye sublimates.

By using the ink having a binder resin dispersed, emulsified, or suspended in a solvent, many types of materials, such as film-form or plate-form polyester and nylon resins, and resin-coated metal plates and cloth, can be printed without repelling the ink and while preventing the ink from running on the materials. Therefore, an increased number of types of media can be used as a transfer medium.

Further, in the transfer of the image formed on a transfer medium, by heating the image at a temperature lower than the melting point of the binder resin, the transfer of the image can be performed without melting the binder resin.

Specifically, there is a problem in that when the image formed using an ink containing solids, such as a resin, on a transfer medium is transferred to a recording medium by pressing the transfer medium against the recording medium, the solids are molten upon transferring the image, so that the transfer medium adheres to the recording medium with high strength, making it difficult to remove the transfer medium from the recording medium.

Further, there is a danger that the solids contained in the ink are transferred to the recording medium to cause the color developed by the sublimation dye to be muddy, adversely affecting the quality of the resultant image.

By the invention, it is possible to prevent a problem in that the binder resin is transferred to the recording medium to cause the color developed by the sublimation dye to be muddy. Further, it is possible to prevent a problem in that the binder resin is molten to cause the transfer medium to adhere to the recording medium.

The transfer printing method according to an embodiment of the invention is a transfer printing method using a transfer printing ink comprising a solvent, a sublimation dye, and a binder resin, wherein the binder resin is dispersed, emulsified, or suspended in the solvent, wherein the transfer printing method includes the steps of: forming an image layer 12 on a transfer paper 11 using the transfer printing ink (image formation step); and heating the image layer 12 in a state in which the side of the transfer paper 11 on which the image layer 12 is formed faces a medium 100 to cause the sublimation dye to sublimate, transferring the dye to the medium 100 (transfer step).

By using the ink having a binder resin dispersed, emulsified, or suspended in a solvent, many types of materials can be printed without repelling the ink and while preventing the ink from running on the materials.

In the transfer printing method according to an embodiment of the invention, the binder resin in the transfer printing ink has a melting point which is higher than the lowest temperature at which the sublimation dye sublimates, and, in the transfer step, heating is performed at a temperature in a range of from the lowest temperature at which the sublimation dye sublimates to lower than the melting point of the binder resin.

In the transfer of the image layer 12 formed on the transfer paper 11, by heating the image layer at a temperature lower than the melting point of the binder resin, the transfer of the image layer can be performed without melting the binder resin. Therefore, it is possible to prevent a problem in that the binder resin is transferred to the medium 100 to cause the color developed by the sublimation dye to be muddy. Further, it is possible to prevent a problem in that the binder resin is molten to cause the transfer paper 11 to adhere to the medium 100, making it difficult to remove the transfer paper 11 from the medium 100.

In the transfer printing method according to an embodiment of the invention, the image formation step is conducted by discharging the transfer printing ink onto the transfer paper 11 by ink-jet.

The ink having a binder resin dispersed or emulsified in a solvent can be advantageously used in ink-jet printing. Therefore, an image can be formed with ease by ink-jet printing.

The present invention is not limited to the above-descried embodiments, and can be modified or changed within the scope shown in the appended claims, and embodiments obtained by appropriately combining technical means respectively disclosed in the different embodiments are included in the technical scope of the present invention.

The present invention can be used in transfer printing using a sublimation dye.

What is claimed is:

1. A transfer printing method using a transfer printing ink comprising a solvent, a sublimation dye, and a binder resin, the binder resin being dispersed, emulsified, or suspended in the solvent, the transfer printing method comprising the steps of:
image formation step, forming an image on a transfer medium using the transfer printing ink; and
transfer step, heating the image in a state in which a side of the transfer medium on which the image is formed faces a recording medium to cause the sublimation dye to sublimate, transferring the dye to the recording medium, wherein in the transfer printing ink, the sublimation dye is contained in the binder resin, and the binder resin has a melting point which is higher than the lowest temperature at which the sublimation dye sublimates, and the image formation step is conducted by discharging the transfer printing ink onto the transfer medium by ink-jet.

* * * * *